Feb. 25, 1941. J. H. WALBORN 2,232,832
PRETZEL STICK CUTTER
Filed Nov. 3, 1939 3 Sheets-Sheet 1
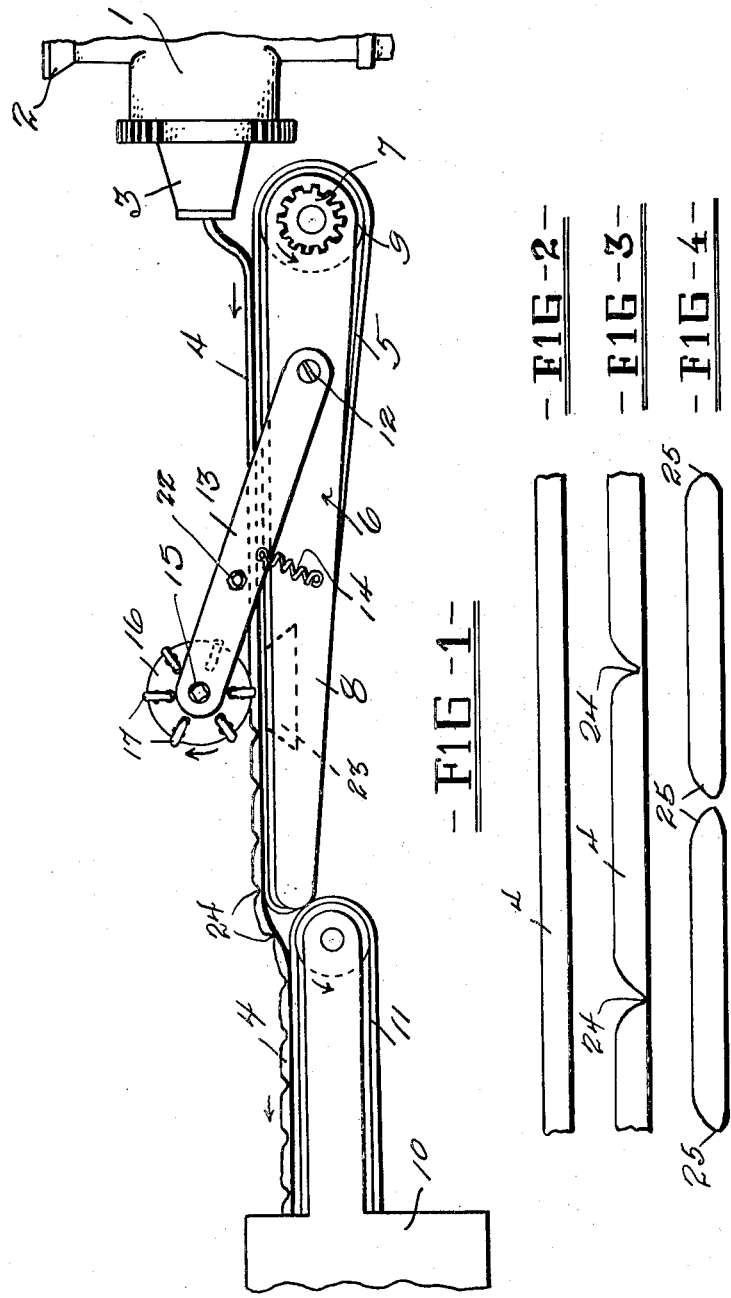
INVENTOR
JOHN H. WALBORN
BY
ATTORNEY

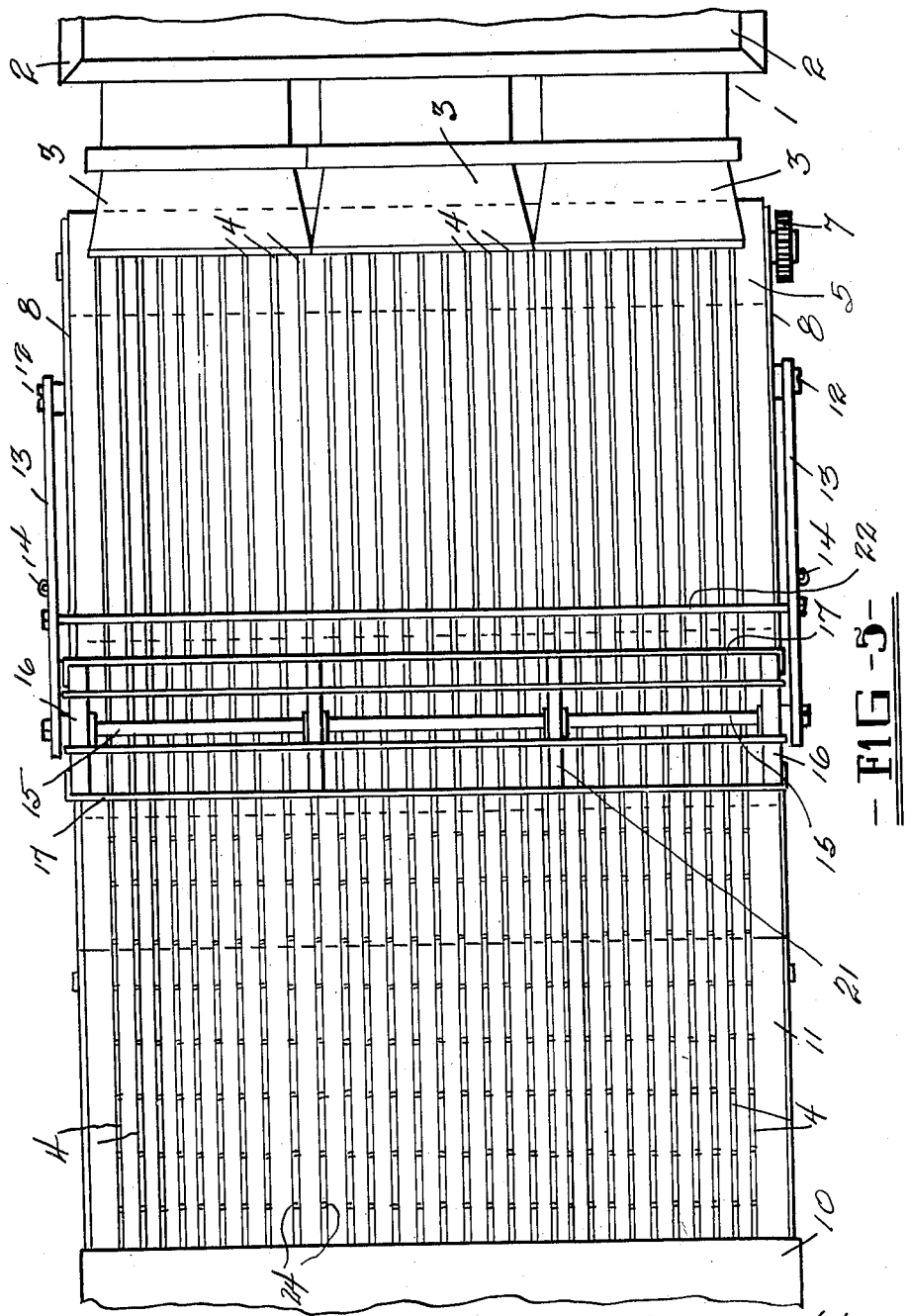

Feb. 25, 1941.  J. H. WALBORN  2,232,832
PRETZEL STICK CUTTER
Filed Nov. 3, 1939  3 Sheets-Sheet 3
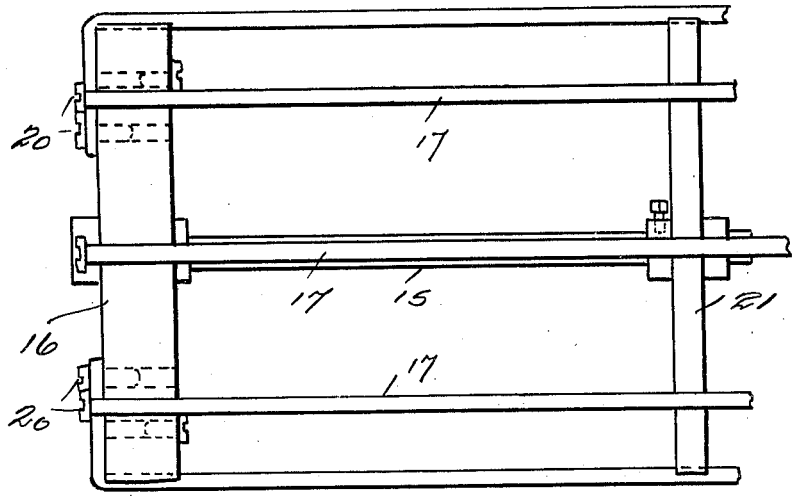
-FIG-6-
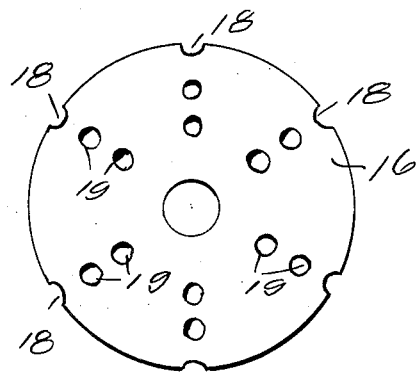
-FIG-8-
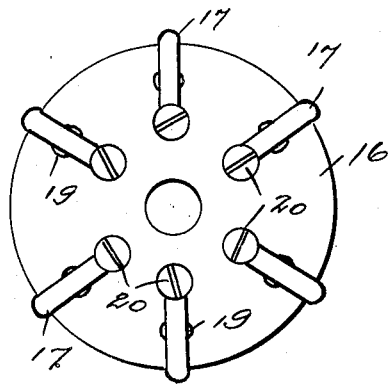
-FIG-7-
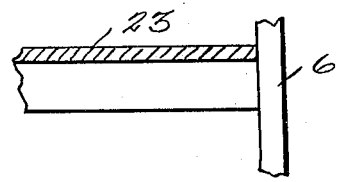
-FIG-9-
INVENTOR
JOHN H. WALBORN
BY
ATTORNEY Patented Feb. 25, 1941

2,232,832

UNITED STATES PATENT OFFICE 2,232,832

PRETZEL STICK CUTTER

John H. Walborn, Harrisburg, Pa.

Application November 3, 1939, Serial No. 302,786

3 Claims. (Cl. 107—21)

My present invention, in its broad aspect, has to do with the means and method of forming what are known as pretzel sticks, and more particularly it is my purpose to provide pretzel sticks whose ends are not ragged and of open texture to readily permit air circulation which is very detrimental to freshness and preservation, especially under the influence of high humidity and when stored for any lengthy period of time. In present practice lumps of dough are deposited in conventional stick forming machines, which process the dough to form a plurality of continuous strips or strings, which are picked up by a canvas conveyor belt as they leave the stick forming machine. Ordinarily the canvas conveyor belt carries the continuous strips or strings as they are formed by the stick forming machine forward to a wire mesh conveyor belt which is an operating part of the pretzel oven or cooker. That is, the dough strips or strings are carried through the oven or cooker and are converted into baked pretzel sticks. During this process the dough strips pass through a scalding solution which gives them the golden color when completed or baked, and they are also sprinkled with salt. As a process in the baking or cooking operation they are conveyed by the wire mesh conveyor belt to oven conveyor plates which move at the proper speed in relation to the heat to properly bake them. As they leave the oven they are almost hard enough to be brittle, and it is at this stage that a rotating shear cuts the sticks to the desired length. However, the action of the rotating shear on the brittle pretzel stick at this stage in its formation ordinarily forms a very ragged end—sufficient to admit air circulation which is very undesirable and detrimental to the freshness of the sticks, especially when the sticks are stored for any long period of time, or exposed to humid atmosphere. My invention relates to improvements in the foregoing apparatus and method of producing pretzel sticks.

My present invention contemplates either cutting or almost cutting through the pretzel dough strips or strings before they enter the oven, and preferably while they are being carried forward by the canvas belt conveyor. To accomplish this end I provide a revolving drum cutter having fine steel wires arranged on supporting discs which contact the dough strips or strings as they pass thereunder on the canvas belt conveyor, thereby either cutting or indenting the pretzel dough strips or strings to a predetermined depth, and at predetermined intervals to form sticks of desired length. If cut, the cut ends are even and finished and are not subject to deterioration in storing or humid atmospheric conditions; if dented or depressed to a point where they are almost cut through, it has been found that the strips or strings are retained in straight formation as they pass through the oven, and as they leave the oven the sticks separate of their own weight and fall into a bin provided for them; in either case, the sticks are not subject to the undesirable characteristics attendant upon use of the machines ordinarily used and wherein the sticks are cut after baking.

My present apparatus may be briefly defined as consisting of a pair of arms forming a bearing for an axle supported above the canvas conveyor belt and on which are carried discs supporting a plurality of fine steel wires for cutting the dough pretzel strips or strings. Intermediate discs (adjustable on the axle) are provided to sustain the wires in proper position, and suitable tensioning devices are provided both for the wires and the arms, while both the depth of the depressions in the dough strips and the spacing thereof is determined by the setting of the wires.

Other and equally important objects and advantages of my invention will be apparent as the description of its several parts proceeds, but it is emphasized that interpretation of the scope of my invention should only be conclusive when made in the light of the subjoined claims.

In the drawings wherein I have shown a preferred form of my invention—

Figure 1 is a side elevation of my invention;

Figure 2 is a section or fragment of pretzel dough strip before cutting or indenting;

Figure 3 is a section or fragment of pretzel dough strip after indenting;

Figure 4 shows two completed pretzel sticks;

Figure 5 is a top plan view of my invention;

Figure 6 is a fragmentary view of one end of my cutting or indenting drum in side elevation;

Figure 7 is an end view of the same;

Figure 8 is a view of one of my wire supporting discs with the wires removed, and Figure 9 is a detail of the bracket or table for supporting the portion of the canvas belt conveyor beneath the drum.

In the drawings wherein like characters of reference are used to illustrate like or similar parts throughout the several views:

The numeral 1 shows a conventional pretzel stick machine having hoppers 2 and a series of dough strip or strip outlets 3 from which issue continuous strips or strings of pretzel dough 4. These strips or strings are deposited on an endless canvas belt conveyor 5 carried on the frame 6 and receiving power through the gear 7 connected with a suitable prime mover (not shown). The frame has side rails 8 and the belt is carried on the usual rollers 9. There is provided a conventional pretzel baker or oven 10 having as an operative part thereof a wire screen conveyor 11 which is designed to receive the strips or strings of dough 4 from the canvas belt conveyor 5 as shown in Figures 1 and 5.

Pivotally mounted as at 12 to the side rails 8 of the frame 6 are arms 13, each being normally urged downwardly by a spring 14 in addition to the force of gravity. Journalled in the free ends of the arms 13 is an axle 15 carrying end discs 16 on which are strung fine steel wire cutters 17; there being suitable notches 18 in the peripheries of the discs to receive the wires. The wires are adjustably retained in openings 19 in the discs by cap screws 20. The wires contact the canvas conveyor belt and the dough strips or strings 4 and as the belt moves forward the drum formed by the axle, discs and wires is rotated to depress or cut the strips or strings; the action on the strips or strings is determined by the adjustment of the wires, and the length of the resulting pretzel stick is determined by the spacing of the wires on the discs. In order to hold the wires properly in position throughout their length, lighter discs 21 are provided which are mounted for adjustment lengthwise of the axle. The two arms 13 are connected by a reinforcing rod 22 back of the drum so that they maintain proper positions and operate in unison. Beneath the canvas conveyor belt and carried by the side rails 8 is a bracket or table 23 which is arranged beneath the drum to hold the conveyor belt in proper position and provide proper resistance to the action of the cutting or indenting drum. When cut or indented the strips pass to the wire screen conveyor 11 and thence to the oven or baker 10 as shown in Figures 1 and 5.

While the operation of my invention is believed to be apparent from the foregoing, it is pointed out that by indenting the pretzel strings or strips as shown in Figure 3, the web part 24 keeps the strips or strings straight as they pass through the oven, and when baked the sticks separate of their own weight and have finished relatively tight (not open to air circulation) ends 25 as shown in Figure 4. If the strings or strips are fully cut, which can be accomplished by adjustment of the wires and increase of pressure on the dough strips, substantially the same results are accomplished. The mechanical construction of my cutting drum is simple and efficient, and the wires and discs can be easily kept clean, and the use of fine steel wire has been found to prevent sticking of the dough thereto; furthermore the wire strands are adjustable as shown in Figures 6, 7 and 8. Changes in form, size, shape and arrangement of parts may be made under the varying dictates of practice, and such changes come within my inventive concept and the purview of the appended claims.

I claim:

1. In a pretzel stick forming device of the type wherein strips of dough are moved along a continuous predetermined path, a frame, a freely rotatable member pivotally mounted on said frame, and cutting members on said pivoted member and positioned to engage and press through said strips as said member is rotated by said strips during such application of pressure, and having curved cutting surfaces.

2. In a pretzel stick forming device of the type wherein strips of dough are moved along a continuous path, a frame, a freely rotatable member pivotally mounted on said frame to be normally urged toward the strips of dough, and cutting members formed with a circular cross section adjustably mounted on said rotatable member, and positioned to engage and press through said strips as said member is rotated by said strips during such application of pressure.

3. In a pretzel stick forming device of the type wherein strips of dough are moved along a continuous path, a frame, a pair of arms mounted on said frame for free pivoting movement, a freely rotatable member mounted on said arms and having spaced discs, and spaced apart cutting members formed with a circular cross section adjustably mounted on said discs, and positioned to engage and press through said strips as said member is rotated by said strips during such application of pressure, and spring means engaging the frame and the pivoted arms to urge the arms toward the frame.

J. H. WALBORN.